United States Patent [19]

Pellerite

[11] Patent Number: 5,306,758
[45] Date of Patent: Apr. 26, 1994

[54] FLUOROCARBON-BASED COATING COMPOSITIONS AND ARTICLES DERIVED THEREFROM

[75] Inventor: Mark J. Pellerite, St. Paul, Minn.

[73] Assignee: Minnesota Mining and Manufacturing Company, St. Paul, Minn.

[21] Appl. No.: 67,634

[22] Filed: May 26, 1993

Related U.S. Application Data

[63] Continuation of Ser. No. 450,623, Dec. 14, 1989, abandoned.

[51] Int. Cl.$^5$ ............................ C08J 5/10; C08K 5/06; C08L 71/00
[52] U.S. Cl. ................................... 524/366; 524/371; 524/373; 428/352; 428/354; 428/355; 428/447; 428/40; 428/421; 428/422
[58] Field of Search ..................... 524/366, 371, 373; 428/352, 354, 355, 447, 40, 421, 422

[56] References Cited

U.S. PATENT DOCUMENTS

| Re. 24,906 | 12/1960 | Ulrich | 408/184 |
|---|---|---|---|
| 2,736,721 | 2/1956 | Dexter | 525/475 |
| 2,814,601 | 11/1957 | Currie et al. | 528/18 |
| 2,857,356 | 10/1958 | Goodwin | 428/268 |
| 3,318,852 | 5/1967 | Dixon | 428/341 |
| 3,536,749 | 10/1970 | Groves | 560/150 |
| 3,778,308 | 12/1973 | Roller et al. | 428/421 |
| 3,810,870 | 5/1974 | Feasey et al. | 528/86 |
| 3,859,090 | 1/1975 | Yoerger et al. | 430/276 |
| 3,925,283 | 12/1975 | Dahl | 428/40 |
| 3,950,588 | 4/1976 | McDougal | 428/288 |
| 4,057,596 | 11/1977 | Takamizawa et al. | 525/475 |
| 4,216,252 | 8/1980 | Moeller | 427/387 |
| 4,267,238 | 5/1981 | Chernega | 428/422 |
| 4,268,556 | 5/1981 | Pedrotty | 428/65 |
| 4,321,404 | 3/1982 | Williams et al. | 560/115 |
| 4,404,247 | 9/1983 | Dominguez-Burguette et al. | 428/213 |
| 4,472,480 | 9/1984 | Olson | 428/332 |
| 4,526,833 | 7/1985 | Burguette et al. | 428/336 |
| 4,565,741 | 1/1986 | Morimoto et al. | 428/427 |
| 4,567,073 | 1/1986 | Larson et al. | 428/40 |
| 4,569,962 | 2/1986 | Burguette et al. | 522/74 |
| 4,614,667 | 9/1986 | Larson et al. | 427/508 |
| 4,820,588 | 4/1989 | Brinduse et al. | 428/422 |
| 4,830,910 | 5/1989 | Larson | 428/336 |

FOREIGN PATENT DOCUMENTS

0098698  1/1984  European Pat. Off. .

OTHER PUBLICATIONS

*Chemical Abstracts, vol. 113, No. 23, Dec. 3, 1990, Abstract No. 213979Q.

*Primary Examiner*—Paul R. Michl
*Assistant Examiner*—U. K. Rajguru
*Attorney, Agent, or Firm*—Gary L. Griswold; Walter N. Kirn; David L. Weinstein

[57] ABSTRACT

Curable, crosslinkable compositions and coatings prepared therefrom that can be used to form low-surface energy liners that can be used with aggressive pressure-sensitive adhesives, such as adhesives formed from silicone resins. The release characteristics of these coatings do not diminish upon aging and do not adversely affect the readhesion properties of adhesives that have-come in contact with the coatings. The invention further provides substrates bearing a layer of the composition of the invention. These coated substrates are particularly suitable for release liners, especially differential release liners and low-adhesion backsizes for pressure-sensitive adhesive tapes and sheet materials, especially for pressure-sensitive adhesives derived from silicone resins. Because the coatings of this invention can have more than 50% by weight inert oils without significantly reducing the readhesion of adhesives removed from them, they provide an economic advantage over those coatings prepared by using only the more expensive reactive group-containing polyfluoropolyethers.

14 Claims, No Drawings

FLUOROCARBON-BASED COATING COMPOSITIONS AND ARTICLES DERIVED THEREFROM

This is a continuation of application Ser. No. 07/450,623 filed Dec. 14, 1989 now abandoned.

BACKGROUND OF THE INVENTION

1. Field Of The Invention

This invention relates to release liners, and more particularly, to release liners suitable for use with highly aggressive pressure-sensitive adhesives.

2. Discussion of the Art

Pressure-sensitive adhesive tape, which is typically wound into rolls, has a low-adhesion backsize coating applied to the major surface of the backing not bearing adhesive to permit the tape to be unwound without delamination and transfer of adhesive to the surface of the backing not bearing adhesive. The force required to separate the adhesive layer from the low-adhesion backsize coating, i.e., peel force, ranges from 6 to 35 Newtons per decimeter (N/dm) per unit width. If the tape is not wound into a roll, its adhesive layer is customarily protected by a disposable web that bears a low-adhesion coating to which normally tacky and pressure-sensitive adhesives adhere very weakly, e.g., a peel force ranging from about 0.2 to about 6 N/dm, preferably 0.2 to 2 N/dm. Release coatings having peel forces in this preferred range of 0.2 to 2 N/dm are hereinafter referred to as "premium release" coatings.

Release coatings must both adhere strongly to the backing and be sufficiently cured or rendered incompatible with the adhesive so that it does not transfer to the adhesive layer and adversely affect adhesive power of the adhesive. Low adhesion backsize coatings having such properties are disclosed in U.S. Pat. Nos. 3,318,852; 3,536,749; 4,057,596; and 4,216,252.

Certain pressure-sensitive adhesives, particularly those derived from silicone resins, are so aggressive that tapes employing them exhibit undesirably high peel forces upon removal from known low-adhesion coatings, especially after prolonged storage or when used in a high-temperature environment. The adhesive of such tapes may carry away, and consequently, be contaminated by appreciable amounts of the low-adhesion material. If this occurs, the tapes will exhibit poor readhesion when applied to "end-use" receptor surfaces.

Known low-adhesion coatings, e.g. poly(urethanes), poly(tetrafluoroethylenes), and poly(dimethylsiloxanes), do not provide release peel forces in the range 0.2 to 2 N/dm when used with poly(dimethylsiloxane) adhesives.

The utility of polymeric fluorocarbons as release coatings has been disclosed in U.S. Pat. Nos. 4,472,480; 4,567,073; and 4,614,667. Uncrosslinked fluorinated waxes and oils are frequently used as lubricants and mold release agents in applications where low adhesion coatings are designed to fail cohesively within the bulk phase. Conversely, crosslinked fluorinated waxes and oils are preferred when it is desired to avoid cohesive failure of release liners. Examples of crosslinking reactions that have been used to prepare low energy release liners are photochemical crosslinking, described in U.S. Pat. Nos. 4,472,480; 4,567,073; and 4,614,667; thermal crosslinking of silicone resins, described in U.S. Pat. No. 4,472,480; and chemical crosslinking of silicone resins (hydrosilation), described in U.S. Pat. No. 4,565,741.

U.S. Pat. No. 4,321,404 describes abherent coatings made by using electron beam radiation to polymerize a mixture of film-forming and polyfluorinated oligomers in a single step. The mixture is formulated so that the fluorinated materials tend to segregate at the coating surface, i.e., the air interface, so that the abherent coating can be crosslinked with a single pass through the electron beam curtain. These coating,#have excellent readhesion; however, they were formulated for use with acrylic adhesives and typically have high release values when used with these adhesives. These release values would be higher still if these abherent coatings were used with the highly aggressive silicone pressure-sensitive adhesives.

In order to further reduce the possibility of cohesive failure, a crosslinked primer coating to securely anchor the release coating to its backing has been used. U.S. Pat. Nos. 4,567,073 and 4,614,667 disclose the advantage of first photopolymerizing a thin layer of a film-forming polymer that is strongly bonded to the surface of a substrate. This primer layer is also capable of subsequently reacting with functional groups attached to a polyfluoropolyether, which is applied as a second thin layer over the photopolymerized layer, thereby chemically bonding the release coating to the inner primer layer. These release liners exhibit release of about 0.6 N/dm, and excellent readhesion for certain classes of silicone-based pressure-sensitive adhesives.

SUMMARY OF THE INVENTION

The present invention provides curable, crosslinkable compositions and coatings prepared therefrom that can be used to form low-surface energy liners that can be used with aggressive pressure-sensitive adhesives, such as adhesives formed from silicone resins. The release characteristics of these coatings do not diminish upon aging and do not adversely affect the readhesion properties of adhesives that have come in contact with the coatings.

Briefly, the compositions of the present invention comprise a crosslinkable polyfluoropolyether and an inert polyfluoropolyether oil. The compositions can be dissolved in mixtures of fluorinated solvents in order to provide solutions having a viscosity suitable for coating by methods well known in the art.

The composition preferably contains from about 15 to about 90% by weight crosslinkable polyfluoropolyether, more preferably from about 50 to about 85% by weight, and from about 10 to about 85% by weight inert polyfluoropolyether oil. It is preferred that the polyfluoropolyether oil have a viscosity from about 20 to about 500 centipoise at 25° C., more preferably from about 90 to about 200 centipoise at 25° C.

The invention further provides substrates bearing a layer of the composition of the invention. These coated substrates are particularly suitable for release liners, especially differential release liners and low-adhesion backsizes for pressure sensitive adhesive tapes and sheet materials, especially for pressure-sensitive adhesives derived from silicone resins.

Likewise, the release coatings of this invention are specifically formulated and cured to resist cohesive failure within the bulk phase but to fail uniformly along an extremely thin, weak boundary layer at the release coating-adhesive interface.

It has been found that silicone adhesives on the fluorochemical release liners of the present invention will not suffer dramatic reductions of the readhesion value, as will acrylic adhesives on silicone-based release liners if uncured material is present. Surprisingly, pressure-sensitive adhesives in contact with the release liners of the present invention can have very high readhesion values—in excess of 90% of those of control adhesives which have not been in contact with any release coating or liner. Such high readhesion values are indicative of little, if any, transfer of fluorocarbon materials of low surface energy to the pressure-sensitive adhesive. Because the coatings of this invention can have more than 50% by weight inert oils without significantly reducing the readhesion of adhesives removed from them, they provide an economic advantage over those coatings prepared by using only the more expensive reactive group-containing polyfluoropolyethers.

DETAILED DESCRIPTION OF THE INVENTION

The reactive group-containing, crosslinkable polyfluoropolyethers suitable for use in this invention are represented by the general formula:

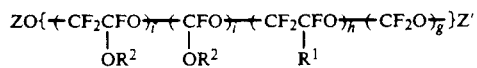

wherein
- Z represents a terminal group that either contains a functional moiety that can enter into an addition or condensation reaction to form a polymer or an inert moiety incapable of entering into a reaction to form a polymer;
- Z' represents a terminal group that contains a functional moiety that can enter into an addition or condensation reaction to form a polymer;
- each $R^1$ independently represents a fluorine or a perfluoroalkyl group that can be linear, branched, or cyclic;
- each $OR^2$ independently represents a perfluoroalkoxy group wherein $R^2$ represents a perfluoroalkyl group or a perfluoroalkyl group substituted with one or more ether oxygen atoms, independently selected from the units having the structure —($R^3O$)$_f$—$R^4$, in which each $R^3$ is independently selected from —$CF_2$, —$CF_2CF_2$—, and

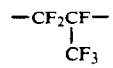

and $R^4$ represents a perfluoroalkyl group selected from linear, branched, and cyclic groups,
- f is zero or a number having a value of 1 to 6,
- g is a number representing the average number of —(CF$_2$O)— units randomly distributed within the chain and has a value of zero or greater,
- h is a number representing the average number of

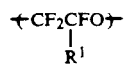

units randomly distributed along the chain and has value of 1 or greater;
- i and i' can be the same or different and each is a number representing the number of

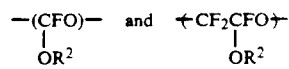

units, respectively, distributed within the chain, the sum of i and i' having a value of 0 or greater and the ratio i/i' being 0 to 5;
- the ratio of g/h being less than 10;
- the ratio of (i+i')/(g+h) being 0.0 to 1.5; and
- the number average molecular weight of the polyfluoropolyether being from about 640 to 20,000.

Especially useful in the practice of this invention are polyfluoropolyether polymers having non-perfluorinated, crosslinkable end groups such as acrylate, isocyanato, or bis(amidopropyltriethoxysilane). Examples of structures of such polymers are as follows:

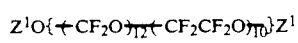

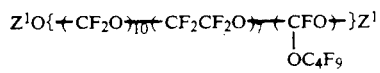

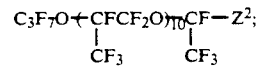

where

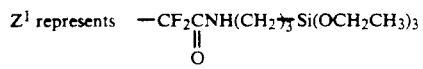

and

or

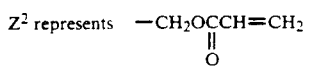

-continued
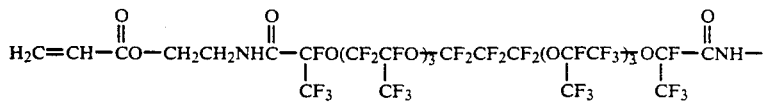
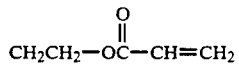
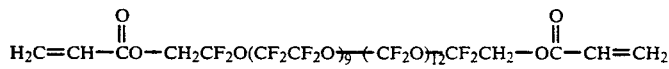
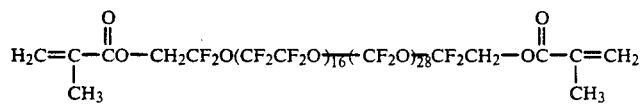
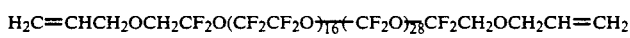
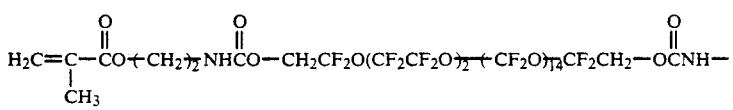
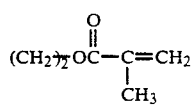
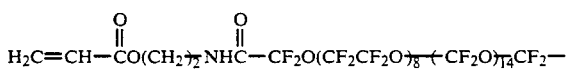
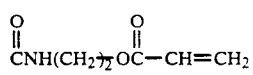
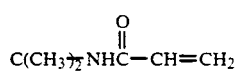
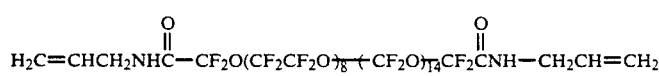
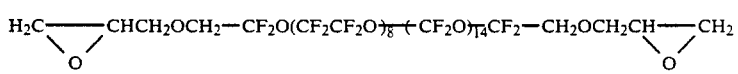
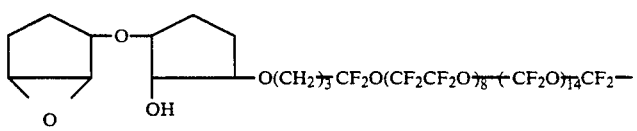
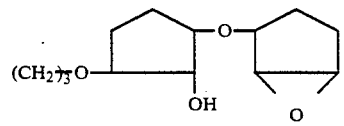
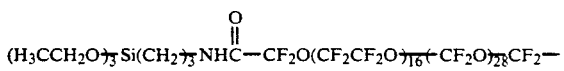
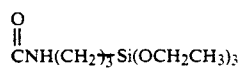

-continued

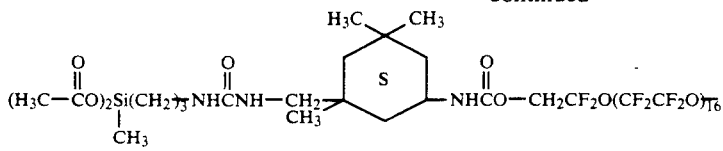

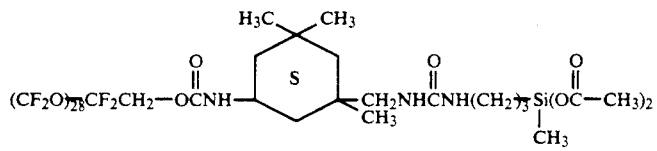

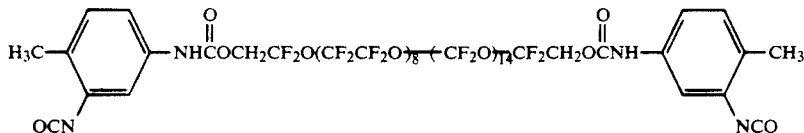

Many other combinations of crosslinkable end groups and polyfluoropolyether polymer backbones are useful in this invention.

The general formula for inert polyfluoroether oils are represented by the general formula:

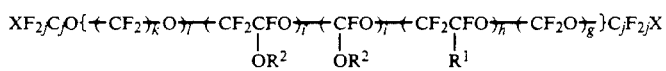

wherein
each x independently represents hydrogen or halogen, provided that when X represents hydrogen, then j is 1 or 2, and when X represents halogen, then j is an integer of form 1 to 5;
$R^1$, $OR^2$, $R^3$, $R^4$, f, g, h, i, i' are as defined previously;
k represents 3 or 4; and
l represents 1 or a number greater than 1.

Examples of inert polyfluoropolyether fluids useful in the practice of this invention include those designated by the trade names "Krytox" 1506, "Krytox" 1514, "Krytox" 1645, commercially available from E. I. DuPont de Nemours and Company, "Demnum" fluids, commercially available from Daikin, and "Fomblin" Y and "Fomblin" Z fluids, commercially available from Montecatini-Edison.

Examples of structures of such polymers are as follows:

"Krytox" fluids:

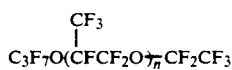

where
n≈13 (for "Krytox" 1506)
n≈19 (for "Krytox" 1514)
n≈26 (for "Krytox" 1645)
"Demnum" S-65 fluid:

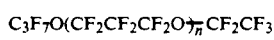

where
n≈25
"Fomblin" Y fluids:

Y-VAC 14/6

-continued

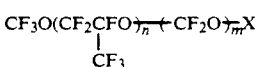

where
n≈16
m≈1
X represents $CF_3$, $C_2F_5$, $C_3F_7$, or $C_4F_9$
"Fomblin" Z fluid:

where
n≈10 to 100
m≈10 to 100
X, $Y^1$ independently represent $CF_3$, $C_2F_5$, $CF_2Cl$, or $CF_2CF_2Cl$
Hydrogen-terminated perfluoropolyether

where
n≈10
m≈12

As used herein, the values of m and n represent averages for a distribution of structures. The symbol "≈" means approximately equals.

Many other inert fluids derived from polyfluoropolyether polymers are useful in this invention.

Examples of catalysts and initiators that can be used to crosslink the components of the composition of this invention include dibutyltin diacetate, benzildimethylketal, perfluoroalkylcarboxylic acids, sulfonic acids, and 2-hydroxyl-2-methyl-1-phenylpropane-1-one ("Darocur" 1173, available from EM Industries, Inc.).

Solvents that can be used for applying the composition of this invention include mixtures of the "Freon" series, e.g., 1,1,2-trichlorotrifluoroethane, the "FC"

series of perfluorinated hydrocarbons, e.g., perfluorooctane, hexafluoroxylene, and trifluorotoluene.

The composition of this invention can be applied to a substrate to form a low energy surface liner by the following process:

(a) providing a solution comprising the functional polyfluoropolyether, the inert polyfluoropolyether, a catalyst for the crosslinking reaction, and a mixture of fluorinated solvents, (b) coating the solution onto a substrate, (c) curing the coated composition either thermally or by irradiation depending on the nature of the curing agent, for a suitable period of time, typically ranging from a fraction of a second to five minutes or more.

Substrate shapes that are suitable for the composition of the present invention include sheets, fibers, and materials of other shapes. Preferred substrate materials include flexible sheet materials that are used as backings for pressure-sensitive adhesive products, such as, for example, polyester, polyimide, polyamide, polyolefin, and polycarbonate films. Other substrate materials that are suitable for the composition of this invention include glass, ceramic, metal, and rubber.

The coating techniques that are useful for applying the composition of this invention include brushing, wire-wound rod or knife coating, spraying, curtain coating, and gravure coating.

In some cases, it may be desirable to first apply to the substrate a primer or an adhesion-promoting coating or to treat the substrate. Such treatments are described in U.S. Pat. Nos. 4,567,073 and 4,614,667.

A substrate bearing a coating of the cured composition of the invention on one or both major surfaces thereof can then be coated with any adhesives known in the art, such as, for example, acrylic adhesives, rubber-based adhesives, and silicone-based adhesives. The adhesive-coated substrate can then be wound up into a roll, if desired. Flexible, pressure-sensitive adhesive-coated sheet materials are well known in the art. See, for example, U.S. Pat. Re. 24,906 (acrylate), U.S. Pat. Nos. 2,857,356; 2,814,601; and 2,736,721 (siloxane), and U.S. Pat. No. 3,925,283 (urethane).

The releasability of the coatings of this invention with respect to adhesives can be measured by various methods known in the art. The method selected depends upon whether the final product is in sheet or roll form, such as a tape. Various methods for testing pressure-sensitive tapes are reported by the Pressure-Sensitive Tape Council (PSTC) in "Test Methods for Pressure-Sensitive Tapes".

The release values of the cured polyfluoropolyether-coated substrates prepared in the following examples were determined as follows:

Dry Laminate Adhesives

A strip of tape bearing a layer of polysiloxane adhesive was pressed against the surface of a polyfluoropolyether coating under the weight of a 2.3 kg rubber roller to produce a laminate consisting of pressure-sensitive adhesive tape and a polyfluoropolyether-coated substrate. The laminate is then subjected to heat aging. The release value is the force required to separate the layer of adhesive from the release-coated substrate at a peel angle of 180° and a peel rate of 230 cm/min.

Adhesives Cast From A Solvent

The adhesive was applied to a polyfluoropolyether-coated substrate by means of a knife coater or other suitable coating device, dried, and cured if required. The exposed surface of the layer of adhesive was then laminated to a polyester film having a thickness of 50 micrometers. Strips having a width of 2.5 cm were cut from this laminate, and the release value was measured as described above.

The readhesion value of the pressure-sensitive tape was determined as follows:

After being removed from the polyfluoropolyether-coated substrate, the pressure-sensitive adhesive was applied to the surface of a clean glass plate by means of a 2.3 kg rubber roller. The readhesion value is a measure of the force required to pull the tape from the glass surface at an angle of 180° at a rate of 230 cm/min.

Advantages of this invention are further illustrated by the following examples, but the particular materials and amounts thereof recited in these examples, as well as other conditions and details, should not be construed to unduly limit this invention. In the following examples, all values of m and n are average values.

EXAMPLE 1

This example demonstrates the effect of inert fluid on the release and readhesion performance of coatings prepared from "Krytox" 1506 polyfluoropolyether fluid or "Krytox" 1514 polyfluoropolyether fluid and a polyfluoropolyether bis(triethoxysilane)(hereinafter Compound I).

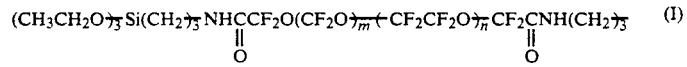

m = 12
n = 10

Five coating solutions comprising 6% by weight of a mixture of polyfluoropolyether bis(triethoxysilane) (Compound I) and perfluoropolyether fluid in a solvent comprising 40% by volume 1,1,2-trichlorotrifluoroethane ("Freon" 113) and 60% by volume perfluorooctane ("IFC-75") were prepared.

In the five coating solutions, the ratio by weight of polyfluoropolyether bis(triethoxysilane) to polyfluoropolyether fluid was 95:5, 90:10, 85:15, 80:20, and 70:30. The polyfluoropolyether fluids used were "Krytox" 1506 and "Krytox" 1514 fluids.

A cure catalyst, dibutyltin diacetate (2% by weight, based on total polyfluoropolyether charge), was added to each solution. Release liners were made by coating the aforementioned solutions onto polyethylene terephthalate films (50 micrometers thick) by means of a #4 mayer bar, thereby producing coatings having a nominal coating thickness of 0.5 micrometers. The liners were cured for about 16 hours at about 25° C. The cured liners were laminated to 2.5 cm wide strips of adhesive tape having an aggressively tacky methylsilicone pressure-sensitive adhesive ("MacDermid" MACU Tape P-3) by pressing the adhesive into contact with the liner by means of a 2.3 kg rubber roller. The initial values of "Release Peel Force", "Readhesion Peel Force" and "Control Peel Force" were measured by means of a peel tester (3M Model 90, available from Instrumentors, Inc.). The 180° peel force was measured at a peel rate of 230 cm/min. After being peeled off the liner, the pressure-sensitive adhesive was immediately readhered to a clean glass plate by means of a 2.3 kg hard rubber roller (two passes), and the 180° peelback force (the "Readhesion Peel Force") was again measured at a peel rate of 230 cm/min.

Another piece of the test tape was adhered to a clean glass plate and tested in the same way as in the previous test to provide the "Control Peel Force". The reduction in "Readhesion Peel Force" versus "Control Peel Force" was presumed to result from transfer of liner material to the pressure-sensitive adhesive. Some of the laminates were aged for 72 hours at 70° C. prior to testing. The test results are set forth in Table I.

TABLE I

| "Krytox" designation | Ratio of Compound I to fluid | Release force (N/dm) | Readhesion[a] (N/dm) |
|---|---|---|---|
| — | 100:0 | 20.4 | 30.9 |
| 1506 | 95:5 | 15.5 | 32.1 |
| 1506 | 90:10 | 10.3 | 31.9 |
| 1506 | 85:15 | 1.2 | 42.0 |
| 1506 | 80:20 | 1.1 | 42.2 |
| 1506 | 70:30 | 0.4 | 35.4 |
| 1514 | 95:5 | 1.2 | 41.1 |
| 1514 | 90:10 | 0.8 | 43.0 |
| 1514 | 85:15 | 0.4 | 40.6 |
| 1514 | 80:20 | 0.3 | 37.0 |
| 1514 | 70:30 | 0.2 | 32.7 |

[a]Control readhesion for fresh adhesive was approximately 39 N/dm. As used herein, "control readhesion" means the adhesion of an adhesive that has never been in contact with a release liner.

EXAMPLE 2

This example demonstrate preparation of release coatings for solvent-cast silicone adhesives. Release liners were applied to PET film (50 micrometers) by means of coating with a #4 R.D.S. wire-wound rod a solution containing 6% by weight of a mixture of 83% by weight polyfluoropolyether bis(triethoxysilane) (Compound I) and 17% by weight "Krytox" 1506 fluid in a solvent containing 40% by volume 1,1,2-trichloro-trifluoroethane ("Freon" 113) and 60% by volume perfluorooctane ("FC-75"). The solution also contained 4% by weight dibutyltin diacetate (based on total polyfluoropolyether charge). The coatings were allowed to cure overnight in air at room temperature. Wet-cast silicone adhesive DC-355 and GE-6574 were applied to the release coatings under the conditions specified in Table II. After the adhesive had dried and cured, it was laminated to PET film (50 micrometers). Pieces of the laminates of 2.5 cm width were cut for release and readhesion measurements. These measurements were made by means of the procedures described in Example 1. The results are set forth in Table II.

TABLE II

| Adhesive | Release (N/dm) | | Readhesion (N/dm)[a] | |
|---|---|---|---|---|
| | Initial | Aged | Initial | Aged |
| DC-355 | 0.2[b] | 0.3[b] | 63.2[b] | 64.2[b] |
| | 0.5[d] | 11.9[d] | 66.9[d] | 61.5[d] |
| GE-6574 | 0.3[c] | 0.2[c] | 99.6[c] | 100.1[c] |

TABLE II-continued

| | | | |
|---|---|---|---|
| | 25.6[e] | — | 82.7[e] | — |

[a]Control readhesion for fresh adhesives: DC-355, approximately 82 N/dm; GE-6574, approximately 100 N/dm.
[b]The adhesive was coated from 18% by weight solution in 1,1,2-trichlorotrifluoroethane ("Freon" 113), at a wet film thickness of 250 micrometers. The coating was dried 24 hours at room temperature, no catalyst was used. Initial release measurements were made after heating the laminates for 24 hours at 70° C.; aged release measurements were made after 7 days at 70° C.
[c]The adhesive was coated from 33% by weight solution of toluene/xylene with 2% by weight (based on silicone) "Cadox TS-50" initiator, at a wet film thickness 300 micrometers. The coating was dried at 70° C. for 10 minutes, then cured for 5 minutes at 150° C. Initial release measurements were made shortly after laminating; aged release measurements were made after heating the laminates for 3 days at 70° C.
[d]These values were obtained using release coatings prepared from coating solutions identical to those described in note b, except with 6% by weight compound I (no "Krytox" 1506 fluid present).
[e]These values were obtained using release coatings prepared from coating solutions identical to those described in note c, except with 6% by weight compound I (no "Krytox" 1506 fluid present).

EXAMPLE 3

This example demonstrates the preparation of release coatings having a high content of inert perfluoropolyether fluid.

Six coating solutions consisting of 1.1% by weight mixtures of polyfluoropolyether bis(triethoxysilane) (Compound I) and "Krytox" 1514 fluid in a solvent containing 40% by volume 1,1,2-trichlorotrifluoroethane ("Preon" 113) and 60% by volume perfluorotributylamine ("FC-43") were prepared. In the six coating solutions, the ratio by-weight of polyfluoroether bis(triethoxysilane) to "Krytox" fluid was 50:50, 25:75, 15:85, 10:90, 5:95, and 0:100. The solutions also contained 4% by weight (based on total polyfluoropolyether charge) dibutyltin diacetate as cure catalyst. These solutions were coated onto PET film (50 micrometers) by means of a #4 R.D.S. wire-wound rod. The coated films were heated at 110° C. for one minute and allowed to stand at room temperature in air for several hours. The coatings were tested with MacDermid P-3 and DC-355 silicone adhesives by means of the procedures described in Examples 1 and 2, and initial release, release after aging, and readhesion values were measured. The results are set forth in Table III.

TABLE III

| Percent (wt) "Krytox" 1514 fluid | Adhesive | Release (N/dm) | | Readhesion (N/dm)[a] | |
|---|---|---|---|---|---|
| | | Initial | Aged | Initial | Aged |
| 50 | MacDermid | 0.3 | 0.7 | 33.7 | 35.3 |
| 50 | DC-355 | 0.2 | 0.3 | 73.8 | 72.4 |
| 75 | MacDermid | 0.3 | 0.3 | 33.8 | 33.5 |
| 85 | MacDermid | 0.2 | 0.2 | 32.5 | 33.1 |
| 85 | DC-355 | 0.4 | 0.3 | 74.7 | 75.4 |
| 90 | MacDermid | 0.3 | 1.0 | 32.0 | 30.4 |
| 90 | DC-355 | 10.4 | — | 67.0 | — |
| 95 | MacDermid | 0.8 | 10.3 | 31.1 | 21.4 |
| 95 | DC-355 | 15.9 | — | 68.9 | — |
| 100 | MacDermid | 31.2 | 35.7 | 20.9 | 22.0 |
| 100 | DC-355 | 78.4 | 82.2 | 25.5 | 38.3 |

[a]Control readhesion for fresh adhesives: "MacDermid" P-3, approximately 35 N/dm; DC-355, approximately 82 N/dm.

EXAMPLE 4

This example demonstrates the effect of concentration of inert perfluoropolyether fluid on performance of release coatings with a solvent-cast peroxide cured adhesive.

Three coating solutions comprising 1.1% by weight mixtures of polyfluoropolyether bis(triethoxysilane)

(Compound I) and "Krytox" 1514 fluid, were prepared. In the three coating solutions, the ratio by weight of polyfluoropolyether bis(triethoxysilane) to polyfluoropolyether fluid was 83.j:16.7, 75:25, and 67:33. The solution also contained 4% by weight (based on total polyfluoropolyether charge) dibutyltin diacetate as the cure catalyst. These solutions were coated onto PET film (50 micrometers) by means of a #4 R.D.S. wire-wound rod. The coatings were cured at 110° C. for one minute and then allowed to stand overnight in air at room temperature.

Silicone adhesive (DC-7406)(33% by weight solids in toluene) with 2% by weight (based on silicone solids) initiator ("Cadox TS-5011) was applied to the release coatings by means of a knife coater (300 micrometers orifice). The adhesive was dried at 70° C. for 10 minutes, cured at 150° C. for five minutes, and laminated to PET film (50 micrometers). Strips of 2.5 cm width were cut for peel test measurements. Initial release, release upon aging (70° C. for 72 hours) and readhesion were evaluated by the procedures described in Example 1. The results are set forth in Table IV.

TABLE IV

| Weight Ratio of Compound I to "Krytox" 1514 fluid | Release (N/dm) | | Readhesion (N/dm)$^a$ | |
|---|---|---|---|---|
| | Initial | Aged | Initial | Aged |
| 83.3:16.7 | 0.7 | 27.8 | 65.0 | 57.0 |
| 75:25 | 1.2 | 19.1 | 73.5 | 64.4 |
| 67:33 | 0.9 | 1.1 | 79.7 | 82.3 |

$^a$Control readhesion for fresh adhesive, approximately 77 N/dm

EXAMPLE 5

Release coatings were prepared according to the procedures used in Example 4 from 1.1% by weight solutions of mixtures of polyfluoropolyether bis(triethoxysilane) (Compound I) and various polyfluoropolyether inert fluids. Solvent, catalyst, coating conditions, and curing conditions used were identical to those used in Example 4. The coatings were tested according to the procedures described in Examples 1 and 2. The coatings were laminated with silicone adhesives ("MacDermid" P-3 and DC-355), and initial release, release after aging, and readhesion values were measured. The results are set forth in Table V.

TABLE V

| Inert fluid | Weight ratio of Compound I to inert fluid | Adhesive | Release (N/dm) | | Readhesion (N/dm)$^a$ | |
|---|---|---|---|---|---|---|
| | | | Initial | Aged | Initial | Aged |
| "Demnum" S-65 | 67:33 | "MacDermid" | 0.6 | 1.6 | 32.8 | 32.6 |
| "Demnum" S-65 | 67:33 | DC-355 | 0.3 | 0.3 | 68.1 | 69.1 |
| PPE(H)$_2$$^b$ | 67:33 | "MacDermid" | 0.4 | 0.6 | 35.4 | — |
| PPE(H)$_2$$^b$ | 67:33 | DC-355 | 0.2 | 0.2 | 84.6 | 87.5 |
| "Krytox" 1645 | 75:25 | "MacDermid" | 1.5 | 2.5 | 40.5 | 36.7 |
| "Krytox" 1645 | 75:25 | DC-355 | 1.6 | 2.4 | 69.5 | 66.8 |

$^a$Control readhesion for fresh adhesives: "MacDermid" P-3, approximately 34 to 39 N/dm, some variation between lots. DC-355, 82 to 93 N/dm, some variation between lots.
$^b$PPE(H)$_2$ is an abbreviation for hydrogen-terminated perfluoropolyether.

EXAMPLE 6

A release coating was prepared according to the procedure described in Example 5 from a 1.1% by weight solution of a mixture of polyfluoropolyether bis(triethoxysilane) (Compound I) and "Braycote" 815Z inert polyfluoropolyether fluid. The weight ratio of Compound I to the inert fluid was 67:33. Solvent, catalyst, coating conditions, and curing conditions were identical to those of Example 5. The coating was tested with silicone adhesives ("MacDermid" P-3 and DC-355) by means of procedures described in Examples 1 and 2, and initial readhesion and readhesion after aging were measured. The results are set forth in Table VI.

TABLE VI

| Adhesive | Release (N/dm) | | Readhesion (N/dm)$^a$ | |
|---|---|---|---|---|
| | Initial | Aged | Initial | Aged |
| "MacDermid" | 5.1 | 15.1 | 31.8 | 24.2 |
| DC-355 | 2.7 | 4.9 | 63.6 | 65.5 |

$^a$Control readhesion for fresh adhesives: "MacDermid" P-3, approximately 35 N/dm; DC-355, approximately 82 N/dm

EXAMPLE 7

This example involves preparation of a release coating using a mixture of monofunctional and difunctional reactive materials.

A coating solution (hereinafter Solution A) consisting of 1.1% by weight of a mixture of polyfluoropolyether bis(triethoxysilane) (Compound I), polyfluoropolyether triethoxysilane (Compound II) (n=10), and "Krytox" 1514 fluid, was prepared.

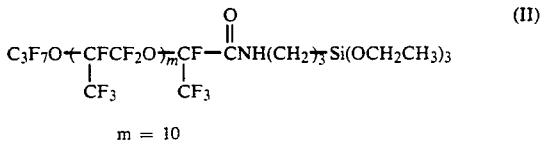

$$m = 10$$

The weight ratio of Compound I to Compound II to the inert fluid was 1:1:1. Solution A also contained 4% by weight (based on total polyfluoropolyether charge) dibutyltin diacetate as cure catalyst. The solvent consisted of 40% by volume 1,1,2-trichlorotrifluoroethane ("Freon" 113) and 60% by volume perfluorotributylamine ("FC-43").

A second coating solution (hereinafter Solution B) was prepared in a manner identical to that used to prepare Solution A. Solution B consisted of a 1.1% by weight solution of a mixture of Compound I and Compound II in a solvent consisting of 40% by volume 1,1,2-trichlorotrifluoroethane ("Freon" 113) and 60% by volume perfluorotributylamine ("FC-43"). The ratio by weight of Compound I to Compound II was 1:1. No "Krytox" 1514 fluid was added to Solution B. These solutions were coated onto PET film (50 micrometers) by means of a #4 R.D.S. wire-wound rod, heated at 110° C. for one minute, then allowed to age in air at room temperature for one week. The coatings were laminated and tested with adhesive tape ("MacDermid" P-3) as described in Example 1. The results from peel measurements are set forth in Table VII.

TABLE VII

| Solution | Release (N/dm) | | Readhesion (N/dm)$^a$ | |
|---|---|---|---|---|
| | Initial | Aged | Initial | Aged |
| A | 3.4 | 6.9 | 33.5 | 31.5 |

TABLE VII-continued

| Solution | Release (N/dm) Initial | Release (N/dm) Aged | Readhesion (N/dm)[a] Initial | Readhesion (N/dm)[a] Aged |
|---|---|---|---|---|
| B | 25.2 | 27.8 | 27.4 | 26.2 |

[a]Control readhesion for fresh adhesive, approximately 35 N/dm

EXAMPLE 8

Coating solutions containing 1.0% by weight of mixtures of polyfluoropolyether bis(triethoxysilane) (Compound I) and "Krytox" 1514 fluid were prepared. The solvent consisted of 40% by volume 1,1,2-trichlorotrifluoroethane ("Freon" 113) and 60% by volume perfluorotributylamine ("FC-43"). The solutions also contained 4% by weight (based on total polyfluoropolyether charge) dibutyltin diacetate. These solutions were coated on polyimide film ("Kapton")(25 micrometers) by means of a #4 R.D.S. wire-wound rod, and cured at 110° C. for 10 minutes. After the coatings had cooled, they were laminated to strips of silicone ;adhesive tape (3M #92, Minnesota Mining and Manufacturing Company) by means of a 2.3 kg rubber roller. The laminates were aged at 130° C. for 17 hours before they were tested for release and readhesion values according to the procedures described in Example 1. The results are set forth in Table VIII.

TABLE VIII

| Weight ratio of Compound I to "Krytox" 1514 fluid | Release (N/dm) | Readhesion (N/dm)[a] |
|---|---|---|
| 100:0 | 20.5 | 26.5 |
| 90:10 | 15.7 | 25.4 |
| 80:20 | 13.6 | 24.5 |
| 70:30 | 5.5 | 25.2 |

[a]Control readhesion for fresh adhesive, approximately 26 N/dm

EXAMPLE 9

This example describes the preparation of ultraviolet radiation-cured release coating prepared from "Krytox" 1514 fluid and polyfluoropolyether diacrylate (Compound III).

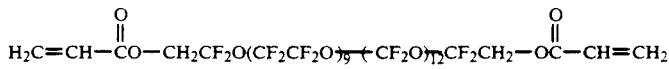

(III)

$$H_2C=CH-\overset{O}{\overset{\|}{C}}O-CH_2CF_2O(CF_2CF_2O)_{\overline{y}}(CF_2O)_{\overline{y_2}}CF_2CH_2-O\overset{O}{\overset{\|}{C}}-CH=CH_2$$

Coating solutions consisting of 1.1% by weight of 100% polyfluoropolyether diacrylate (Compound III) and a mixture of 67% by weight Compound III and 33% by weight "Krytox" 1514 fluid in a solvent consisting of 40% by volume 1,1,2-trichlorotrifluoroethane ("Freon" 113) and 60% by volume perfluorotributylamine ("FC-43") were prepared.

These solutions were coated onto PET film (50 micrometers) by means of a #4 wire-wound rod. Curing was effected by two passes of each coated substrate through a PPG Model 1202 ultraviolet processor at a line speed of 20 re/min, in a nitrogen atmosphere, and at a high lamp power. The coatings were laminated to silicone adhesive tape ("MacDermid" P-3) and the laminates were tested for release and readhesion values according to the procedures described in Example 1. The results are set forth in Table IX.

TABLE IX

| Weight ratio of Compound I to "Krytox" 1514 fluid | Release (N/dm) Initial | Release (N/dm) Aged | Readhesion (N/dm)[a] Initial | Readhesion (N/dm)[a] Aged |
|---|---|---|---|---|
| 67:33 | 0.3 | 0.8 | 32.6 | 28.7 |
| 100:0 | 2.7 | 20.7 | 36.5 | 24.9 |

[a]Control readhesion for fresh adhesive, approximately 35 N/dm

EXAMPLE 10

This example describes the preparation of ultraviolet radiation-cured release coatings with added photoinitiator.

Three coating solutions consisting of 6.0% by weight of mixtures of polyfluoropolyether diacrylate (Compound III) and "Krytox" 1514 fluid, along with 2% by weight (based on total polyfluoropolyether charge) "Darocur" 1173 photoinitiator, in 1,1,2-trichlorotrifluoroethane ("Freon" 113) were prepared. The ratio by weight of Compound III to "Krytox" 1514 fluid in the three mixtures was 100:0, 85:15, and 70:30. The coatings were applied, cured, and tested in accordance with the procedures described in Example 9. The results are set forth in Table X.

TABLE X

| Weight ratio of Compound I to "Krytox" 1514 fluid | Release (N/dm) Initial | Release (N/dm) Aged | Readhesion (N/dm)[a] Initial | Readhesion (N/dm)[a] Aged |
|---|---|---|---|---|
| 85:15 | 0.3 | 1.4 | 34.1 | 33.2 |
| 70:30 | 0.2 | 0.5 | 33.0 | 29.5 |
| 100:0 | 0.2 | 17.0 | 37.8 | 26.0 |

[a]Control readhesion for fresh adhesive, approximately 35 N/dm

EXAMPLE 11

This example describes preparation of release coatings based on urethane-cure chemistry.

A coating solution (hereinafter Solution C) was prepared by mixing, in a vial, polyfluoropolyether diol (Compound IV) (0.85 g), toluenediisocyanate (0.12 g), "Krytox" 1514 fluid (0.32 g), and 1,1,2-trichlorotrifluoroethane ("Freon" 113) (20.2 g).

$$HO-CH_2CF_2O(CF_2O)_{\overline{n_1}}(CF_2CF_2O)_{\overline{y}}CF_2CH_2-OH \quad (IV)$$

After the mixture was shaken to form a solution, dibutyltin diacetate (0.022 g) was added thereto. A coating solution (hereinafter Solution D) was prepared by mixing, in a vial, polyfluoropolyether diol (Compound IV) (1.13 g), toluenediisocyanate (0.16 g), and 1,1,2-trichlorotrifluoroethane ("Freon" 113) (20.2 g). After the mixture was shaken to form Solution D, dibutyltin diacetate (0.022 g) was added thereto. Solution C and Solution D were coated on PET film (50 micrometers) by means of a #4 R.D.S. wire-wound rod, and the coatings were cured at 110° C. for five minutes. After the coatings aged overnight in air at room temperature, they were tested with silicone adhesive (DC-355) according to procedures described in Example 2. Release and readhesion results are set forth in Table XI.

17

TABLE XI

| Coating | Release (N/dm) Initial | Release (N/dm) Aged | Readhesion (N/dm)[a] Initial | Readhesion (N/dm)[a] Aged |
|---|---|---|---|---|
| Solution C | 1.4 | 2.0 | 60.2 | 58.1 |
| Solution D | 32.5 | 49.4 | 58.3 | 53.3 |

[a]Control readhesion for fresh adhesive, approximately 82 N/dm

EXAMPLE 12

This example describes the use of a polyurethane substrate.

A coating solution (hereinafter Solution E) was prepared by mixing, in a vial, polyfluoropolyether diol (Compound IV) (0.88 g), toluenediisocyanate (0.15 g), "Krytox" 1514 fluid (0.26 g), and 1,1,2-trichlorotrifluoroethane.("Freon" 113) (20.15 g). After the mixture was shaken to form a solution, dibutyltin diacetate (0.052 g) was added. A coating solution (hereinafter Solution F) was prepared in the same way from polyfluoropolyether diol (Compound IV) (1.10 g), toluenediisocyanate (0.19 g), trichlorotrifluoroethane ("Freon" 113) (20.15 g), and dibutyltin diacetate (0.052 g). These solutions were coated on "Gravel Guard" polyurethane film by means of a #4 R.D.S. wire-wound rod. The coatings were cured at 1100C for five minutes, then allowed to age overnight in air at room temperature. They were laminated to strips of silicone adhesive tape ("MacDermid" P-3), and the laminates were tested to determine initial release, release after aging, and readhesion according to the procedures described in Example 1. The results are set forth in Table XII.

TABLE XII

| Coating | Release (N/dm) Initial | Release (N/dm) Aged | Readhesion (N/dm)[a] Initial | Readhesion (N/dm)[a] Aged |
|---|---|---|---|---|
| Solution E | 0.2 | 6.6 | 33.5 | 23.5 |
| Solution F | 21.9 | 38.1 | 27.7 | 22.7 |

[a]Control readhesion for fresh adhesive, approximately 35 N/dm

EXAMPLE 13

This example describes the overcoating of inert fluid on a coating of the curable component.

Polyfluoropolyether bis(triethoxysilane) (Compound I) was coated onto PET film (50 micrometers) and cured in the identical manner as described in-Example 1. After the coating was cured overnight at room temperature, it was overcoated with a solution of 1% by weight "Krytox" 1506 fluid in perfluorooctane ("FC-75") by means of a #4 R.D.S. wire-wound rod. After the solvent had evaporated, the composite coating was laminated to strips of silicone adhesive ("MacDermid" P-3) and the laminates were tested to determine initial release, release after aging, and readhesion by means of the procedures of Example 1. The results were as follows. Release: Initial, 0.1 N/dm; aged, 0.2 N/dm. Readhesion: Initial, 38.1 N/dm; aged, 39.4 N/dm. The control readhesion of a fresh adhesive was approximately 39 N/dm.

EXAMPLE 14

This example describes the use of crosslinkable perfluoroether polymer with pendant perfluoroether groups attached to the backbone.

A coating solution consisting of 0.97% by weight of a 1.7:1.0 mixture of polyfluoropolyether bis(triethoxysilane) (Compound V) and "Krytox" 1514 fluid along with 4% by weight (based on the total polyfluoropolyether) dibutyltin diacetate as a cure catalyst in a solvent consisting of 40% by volume 1,1,2-trichlorotrifluoroethane ("Freon" 113) and 60% by volume perfluorotributylamine ("FC-43") was prepared.

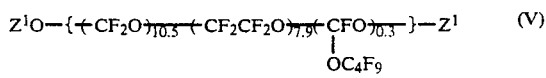

where

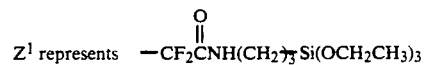

This solution was coated on PET film (50 micrometers) by means of a #4 R.D.S. wire-wound rod, and the coating was cured at 100° C. for five minutes and then allowed to stand overnight in air at room temperature. The coating was tested with silicone adhesive (DC-355) according to the procedure described in Example 2. The results were as follows. Release: Initial 0.2 N/dm; aged 0.2N/dm. Readhesion: Initial 78.7 N/dm; aged 78.3 N/dm. The control readhesion of fresh adhesive was approximately 82 N/dm.

In the preceding examples, the trademarks and tradenames set forth therein were obtained from the source listed in Table XIII.

TABLE XIII

| Trademark or trade name | Source |
|---|---|
| MACu P-3 Tape | MacDermid Co. Inc. |
| "Freon" 113 | E.I. DuPont de Nemours and Company |
| "Krytox" fluids | E.I. DuPont de Nemours and Company |
| "Kapton" film | E.I. DuPont de Nemours and Company |
| "FC" series solvents | Minnesota Mining and Manufacturing Company |
| Gravel Guard PU film | Minnesota Mining and Manufacturing Company |
| DC-355 | Dow-Corning Inc. |
| DC-7406 | Dow-Corning Inc. |
| GE-6574 | General Electric Inc. |
| "Cadox TS-50" | Noury Chemical Co. |
| "Demnum" fluids (Tokyo, Japan) | Daikin Industries |
| "Braycote" 815Z | Bray Oil Co. |
| PPG Model 1202 UV | Pittsburgh Plate Glass Co. |
| "Darocur" 1173 | EM Industries Inc. |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composition suitable for preparing a release coating comprising from about 15% by weight to about 67% by weight of a polyfluoropolyether containing at least two reactive groups and from about 33% by weight to about 85% by weight of an inert polyfluoropolyether oil.

2. The composition of claim 1, wherein the inert polyfluoropolyether has a viscosity of from about 20 to about 500 centipoise at 25° C.

3. The composition of claim 1, wherein the inert polyfluoropolyether has a viscosity of from about 90 to about 200 centipoise at 25° C.

4. The composition of claim 1, wherein the polyfluoropolyether containing at least two reactive groups is capable of crosslinking or polymerizing or both.

5. The composition of claim 4, wherein the reactive groups of the polyfluoropolyether is selected from the group consisting of acrylate, hydrosilane, silanol, silalkoxy, epoxy, and isocyanate.

6. The composition of claim 1, wherein the inert polyfluoropolyether oil is:

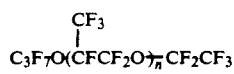

where n≈13, 19, or 26.

7. The composition of claim 1, wherein the inert polyfluoropolyether oil is:

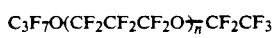

where n≈25.

8. The composition of claim 1, wherein the inert polyfluoropolyether oil is:

Y-VAC 14/6

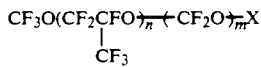

where
n≈16
m≈1

X represents $CF_3$, $C_2F_5$, $C_3F_7$, or $C_4F_9$.

9. A solution comprising the composition of claim 1 and a solvent selected from the group consisting of evaporable fluorocarbons, chlorofluorocarbons, and mixtures thereof, the viscosity of the solution being sufficiently low to permit the deposition of a thin, continuous coating upon a substrate.

10. A substrate bearing a coating formed from the composition of claim 9, wherein said coating has been crosslinked by thermal or actinic energy.

11. Tape comprising a backing bearing on one major surface thereof a layer of pressure-sensitive adhesive and on the other major surface thereof a release coating prepared from the composition of claim 1.

12. The tape of claim 11, wherein said pressure-sensitive adhesive comprises a silicone polymer.

13. The composition of claim 1, wherein the polyfluoropolyether containing at least two reactive groups is

where
m≈12
n≈10
and the inert polyfluoropolyether oil is

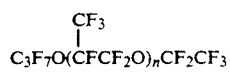

where n≈13 or 19.

14. The composition of claim 1, wherein said polyfluoropolyether having at least two reactive groups comprises from about 50% by weight to about 67% by weight of said composition.

* * * * *

UNITED STATES PATENT AND TRADEMARK OFFICE
CERTIFICATE OF CORRECTION

PATENT NO. : 5,306,758
DATED : April 26, 1994
INVENTOR(S) : Pellerite

It is certified that error appears in the above-indentified patent and that said Letters Patent is hereby corrected as shown below:

Col. 2, line 8, "coating,#have" should be --coatings have--.

Col. 4, line 36, "640" should be --650--.

Col. 7, line 35, "form" should be --from--.

Col. 11, line 41, "demonstrate" should be --demonstrates--.

Col. 12, line 27, "Preon" should be --Freon--.

Col. 13, line 4, "83.j:16.7" should be --83.3:16.7--.

Col. 13, line 14, "Cadox TS-5011" should be --Cadox TS-50--.

Col. 15, line 63, "re/min" should be --m/min--.

Col. 17, line 25, "1100C" should be --110°C--.

Col. 19, line 33, delete "Y-VAC 14/6".

Col. 20, line 9, "composition" should be --solution--.

Signed and Sealed this

Ninth Day of May, 1995

*Attest:*

BRUCE LEHMAN

*Attesting Officer*    *Commissioner of Patents and Trademarks*